G. W. DONNING.
PAPER RETAINING DEVICE.
APPLICATION FILED NOV. 21, 1908.
Reissued Jan. 18, 1910.
13,077.
3 SHEETS—SHEET 1.
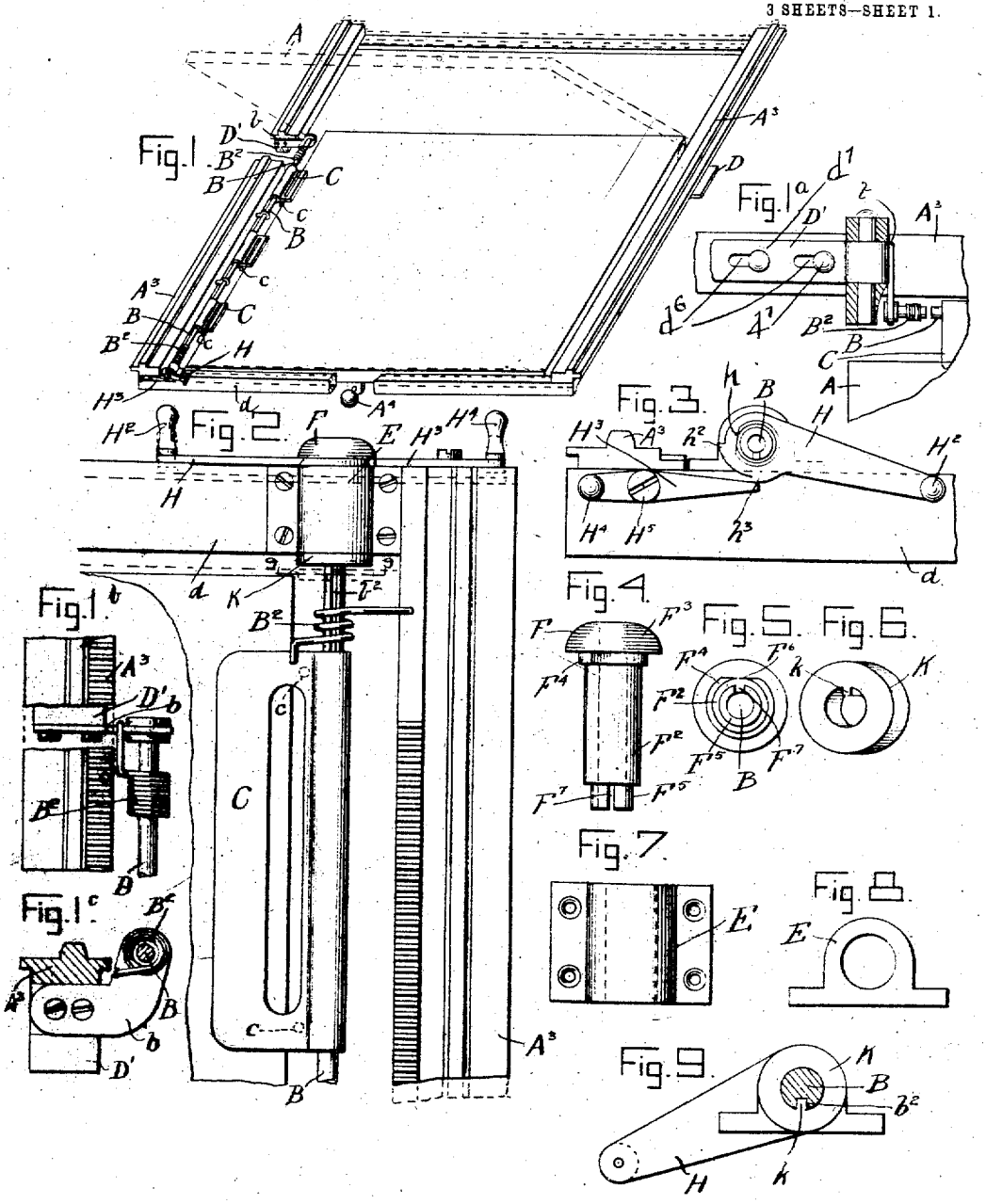
Witnesses
C. K. Reuchenbach
Harold E. Stonebraker
Inventor
George W. Donning,
By Lyon & Parry
his Attorneys

G. W. DONNING.

PAPER RETAINING DEVICE.

APPLICATION FILED NOV. 21, 1908.

Reissued Jan. 18, 1910.

13,077.

3 SHEETS—SHEET 2.

Witnesses

C. K. Reichenbach

Harold C. Stonebraker

Inventor:

George W. Donning,

By Greenforth & Lamp his Attorneys.

G. W. DONNING.

PAPER RETAINING DEVICE.

APPLICATION FILED NOV. 21, 1908.

Reissued Jan. 18, 1910.

13,077.

3 SHEETS—SHEET 3.

Witnesses

C. K. Reichenbach

Harold C. Stonebraker.

Inventor:

George W. Donning,

By Lyon & Parry his Attorneys

UNITED STATES PATENT OFFICE.

GEORGE W. DONNING, OF STAMFORD, CONNECTICUT, ASSIGNOR TO HARRY T. AMBROSE, OF ORANGE, NEW JERSEY.

PAPER-RETAINING DEVICE.

13,077. Specification of Reissued Letters Patent. Reissued Jan. 18, 1910.

Original No. 840,118, dated January 1, 1907, Serial No. 143,420. Application for reissue filed November 21, 1908. Serial No. 463,931.

*To all whom it may concern:*

Be it known that I, GEORGE W. DONNING, a citizen of the United States, residing at Stamford, in the county of Fairfield and State of Connecticut, have invented certain new and useful Improvements in Paper-Retaining Devices, and hereby declare the following to be a full, clear, and exact description of the invention, such as will enable others skilled in the art to which it appertains to make and use the same.

The object of this invention is to provide a marginal clamp for holding work on a flat platen, such as is used in that class of type-writers known as "book" or "commercial" type-writers.

A further object of the invention is to provide in such a clamp means for supporting it independent of the platen and means for elevating it away from the platen to permit the platen to be tilted without interference with the clamp.

Another object is to provide means for securing the clamp so that the track-frame may be shifted longitudinally without disturbing the clamps.

With these and other objects in view my invention comprehends the construction, arrangement, and combinations of parts, as hereinafter more particularly described and claimed.

Figure 14:
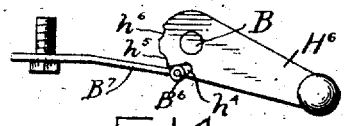
Figure 11:
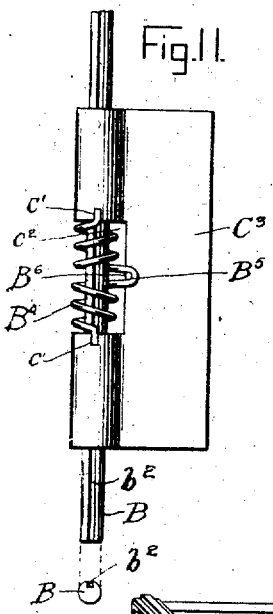
Figure 13:
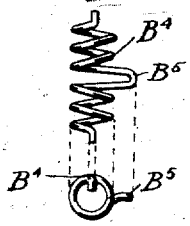
Figure 12:
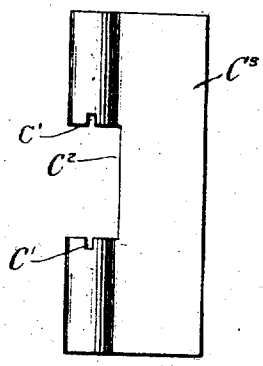
Figure 10:
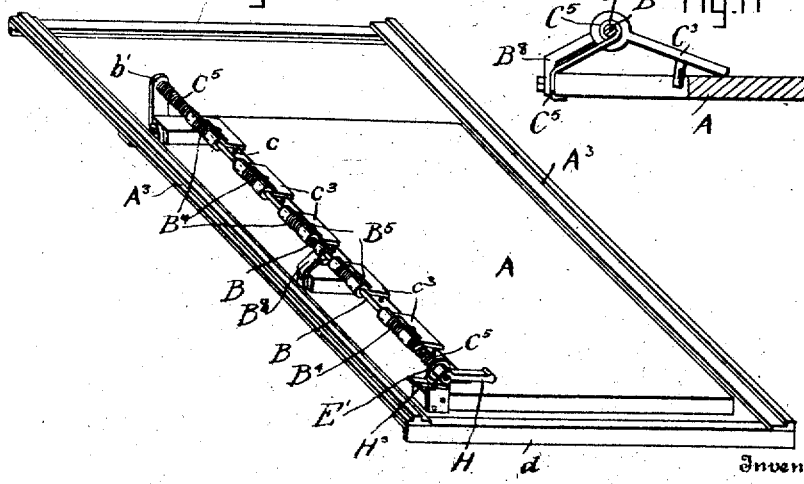
Figure 11A:
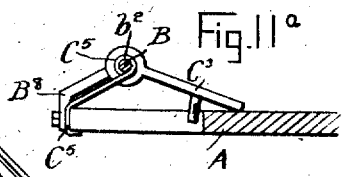
Figure 15:
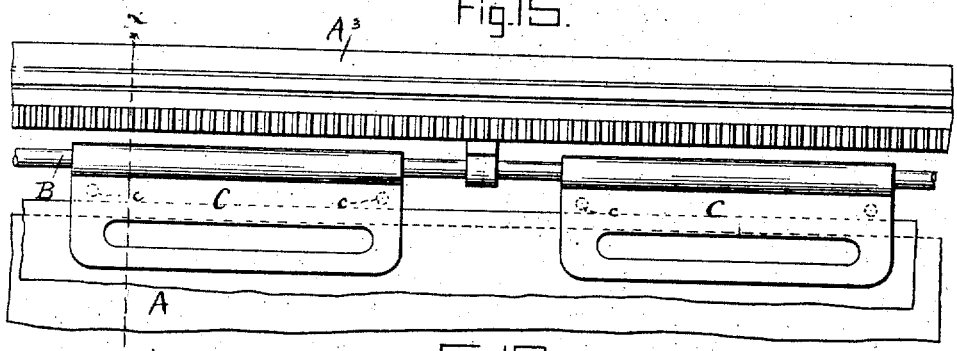
Figure 16:
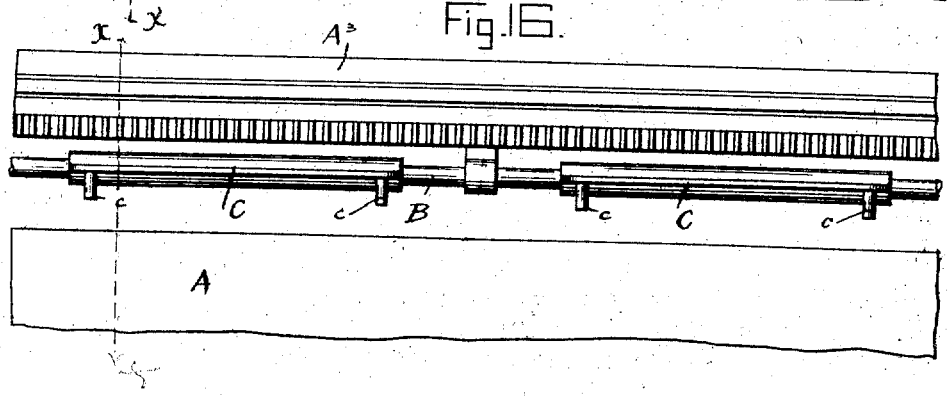
Figure 17:
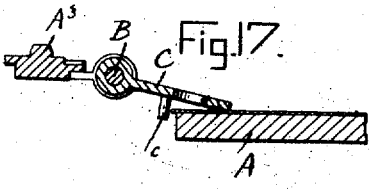
Figure 18:
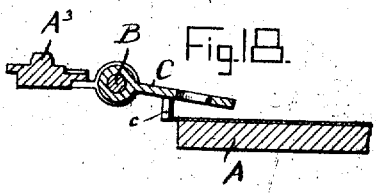
Figure 19:
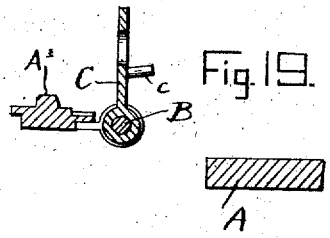

In the drawings illustrating mechanism embodying the invention, Figure 1 is a view in perspective of one form of my clamping device, the platen appearing in dotted lines as tilted. Fig. 1[a] is a bottom plan view of the rear support for the clamping device. Fig. 1[b] is an enlarged fragmentary top plan view of the same. Fig. 1[c] is a side elevation thereof. Fig. 2 is a view in plan, enlarged, to show a clamping-blade and its disposition. Fig. 3 is a view in elevation of the same. Fig. 4 is a detail of a tubular bolt forming a part of the clamping device. Fig. 5 is a view in rear elevation of the bolt and its connected parts. Fig. 6 is a view in perspective of a washer forming a part of the device. Fig. 7 is a view in plan of a journal for the bolt. Fig. 8 is an end view of the same. Fig. 9 is a view on the line 9 9 of Fig. 2. Fig. 10 is a view in perspective of a modification of my device. Fig. 11 is a view in plan of a yieldable blade device employed in this modified form of device with its tensioning-spring. Fig. 11[a] is an enlarged fragmentary view showing the position of the parts relative to the platen. Fig. 12 is another view of one of the blades. Fig. 13 is a view of the spring for tensioning the blade, and Fig. 14 is a view in side elevation of the device for tilting the blade and for holding it in position. Fig. 15 represents a top plan view of a portion of the track-frame and the lateral clamp having guide-pins for the paper sheet. Fig. 16 represents a similar view with the clamping blade in its uppermost position. Fig. 17 represents a transverse section on the line *x x*, Fig. 15. Fig. 18 represents a transverse section on the line *x x*, Fig. 15, showing the clamping blade in its first elevated position. Fig. 19 represents a transverse section on the line *x x*, Fig. 16.

In the drawings, and referring particularly to Figs. 1 to 9, inclusive, A designates the platen, which in this instance is flat and which may be secured to a table in any preferred manner, though in this instance I have illustrated it as hinged, so that it may be tilted when desired and as shown in Fig. 1 of the drawings. Disposed contiguous to the platen and surrounding it is a suitable track-frame A[3], which in this instance is preferably capable of slight longitudinal movement by reason of being slidably mounted, as will presently be described. It will be obvious that any suitable means may be provided for effecting adjustment of the frame or that such adjustment even might be effected by merely pushing the frame back and forth. An adjusting-screw may be located at the front of the frame, as disclosed in my United States Letters Patent No. 753,190, granted February 23, 1904, and such a screw has been merely indicated at A[4] in the accompanying drawings. Disposed preferably parallel with the left-hand member of the frame A[3] is a shaft B, which may be mounted on the frame, as shown in Figs. 1 and 2, or be secured to or mounted upon any other suitable part of the machine. Upon the rod or shaft B are disposed one or more blades C, which may be secured to or connected with the shaft in any preferred manner so long as they are arranged to bear upon the upper surface of the platen when the platen is in its normal position. The forward end of the rod B is in this instance preferably mounted on the forward member of the track-frame in a journal-block hereinafter more fully described. The rear end of the shaft B is mounted in a bracket $b$, Fig. $1^a$, preferably secured upon the tilting element D′ of the support member D of the adjacent track. Said support member is provided with longitudinal slots $d^6$, which receive headed pins $d^7$, Fig. $1^a$, depending from the track-rail, whereby sliding of the track upon its supports is provided for.

As shown on enlarged scale in Fig. 2, the forward end of the rod B is disposed in the journal-box E, mounted on the forward member of the track-frame $A^3$. In the journal-box E is disposed a tubular bolt F, which comprises a shank portion $F^2$, a head $F^3$, a washer portion $F^4$, and a reduced neck portion $F^5$, Fig. 4. The washer portion $F^4$ has a flat part $F^6$, Fig. 5, so that the washer will fit in a correspondingly-shaped irregular aperture $h$ in the operating-lever H, which has a suitable handle $H^2$ for operating the same. The lever H fits on the bolt at this portion and against the head $F^3$, as shown in Fig. 2, and is thus prevented from turning on the bolt by the said registering irregular contours. The bolt is, as stated, tubular and the rear end of the rod B is disposed in the bore of the bolt, as clearly shown in dotted lines in Fig. 2, and is capable of sliding therein. The neck portion $F^5$ of the bolt projects beyond the journal-block E, and the bolt is retained in the block by a washer K, secured on this neck. The washer is provided with a lug or key $k$, which projects through opening $F^7$ in neck portion $F^5$ and slides in the keyway $b^2$ in the shaft B to permit the backward and forward movement of the track-frame on the shaft and at the same time to maintain the shaft in normal position, so that the forward end of the shaft B has a sliding movement in the bore of the bolt F, but may be rotated therewith by the key or projection $k$ engaging a groove $b^2$ in the shaft B, in which it slides when the shaft reciprocates in its bore. On the shaft B is secured one or a series of blades or plates C, these being arranged on the shaft and the shaft being so disposed relative to the normal position of the platen that the blades will bear on the platen at a slight angle.

Attached to the blades or plates C are stop-pins $c$, as shown, occupying a position removed from the edge of the platen, when the blades are in their normal or clamping position. When the clamping member is elevated to its first position, the pins $c$ are moved over to occupy a position adjacent the edge of the platen, as shown in Fig. 18, where they form abutments for the sheet or sheets that are inserted under the clamp, and act as a gage for positioning the same. Upon further elevation of the clamping member, to its uppermost position, the blades and pins carried thereby, are moved entirely out of the path of the platen, when tilted back.

A closed spring $B^2$, Fig. 2, is wound around the shaft both at the forward and rear ends thereof and has one of its ends engaging the blade C, while the other rests loosely upon the track-frame, (see Fig. 2,) so that the shaft and blades may be moved with relation to the track-frame, and the end of the spring will travel on the track-frame. This spring is so wound as to retain the blades normally upon the surface of the platen, and against the force of this tension device, comprising the spring, the shaft may be rocked by the lever H, serving to raise the blades and permit the insertion of the sheet and which may then be tightly clamped upon the platen when the blades are lowered to contact with the sheet. To retain the blades in one or more of their raised positions, the lever H is provided with notches or lugs $h^2$, $h^3$, Fig. 3, that are engaged by a pawl $H^3$, which may be provided with a handle $H^4$ for moving the same when desired. When the lever H is turned a short distance to raise the blades, the pawl $H^3$ will, by gravity, fall into the notch $h^3$, and, upon the lever being released, the lever and the shaft will be retained in this position. After the paper has been inserted the pawl may be moved out of the notch by moving the handle $H^4$ of the pawl $H^3$, the pawl being fulcrumed at $H^5$. With this construction, as will readily be understood, it is possible to raise the clamp slightly and lock it in that position temporarily and then by operating the pawl $H^3$ permit the blade again to contact with the platen and be retained there under the action of the spring $B^2$. If, however, it is desired to raise the clamp still higher, as for permitting the platen to be tilted, the lever H is operated to cause the shaft B to be still further rotated to bring the notch $h^2$ of the lever H into engagement with the pawl, which will then lock it in that position until released, as already described.

When the track-frame is adjusted longitudinally by means of the adjusting-screw $A^4$, as already referred to, the shaft B will remain stationary and movement of the journal-block E upon the shaft B will permit the adjustment of the track-frame longitudinally without disturbing the shaft, and thus the blades C. This is an important feature, since it is often desirable, after the writing-sheet has been secured to the platen, to adjust the track-frame longitudinally to position the writing mechanism, which is supported on the track-frame, intermediate of the regular line-spacing, as fully disclosed in my Patent No. 753,190 already referred to.

In Figs. 10 to 13, inclusive, I have illustrated a modified form of construction, the modification residing in providing each blade $C^3$ with a spring in addition to the springs disposed upon the shaft B at each end, as in the construction already described. In the modification I have illustrated the rod B as supported in blocks disposed upon the platen in lieu of disposing them upon the track-frame, as in the construction illustrated in Fig. 1. In the form of device illustrated in Fig. 10 the shaft B is provided with the groove $b^2$ and operates at the rear in the bracket $b'$ and at the front in the journal-block E'. Each blade is preferably provided with a spring $B^4$, each end of which takes into slots $c'$ in the walls of an opening $c^2$ in the blade and also in the groove $b^{12}$ of the shaft B, the spring being provided with a central projecting portion $B^5$, which bears centrally upon the blade, as illustrated in Fig. 11. In this instance the blades are not secured rigidly upon the shaft, as in the first construction, but have slight movement thereon. The movement of each blade upon the shaft is limited, so that when the shaft B is rotated all of the blades may be lifted to raise them up from the surface of the platen.

In Fig. 14 is illustrated a modification of the operating-lever and retaining device therefor. In this construction the lever $H^6$ for operating the shaft is provided with notches $h^4$, $h^5$, and $h^6$ upon its inner curved end, Fig. 14, and these are to be engaged by a roller $B^6$ upon the spring-arm $B^7$, secured in any preferred manner upon the platen, so that it will be in operative relation with the lever $H^5$. It will be understood that when the lever $H^5$ is raised it will cause the roller $B^6$ to ride over the notch $h^4$ into the notch $h^5$ or into the notch $h^6$, according to the height to which the blades are to be raised. The springs $C^5$ at the ends of the rod or the shaft B have one of their ends engaging the groove $b^2$ and are coiled around the shaft, and the other end bears upon the platen, so that when the shaft B is rotated the spring is placed under tension to force the blades back upon the platen when the arm $B^7$ is moved to release the roller $B^6$ from engagement with the notches $h^5$ or $h^6$ in the lever $H^5$. By this construction the blades $C^3$ are each forced against the platen with a yielding pressure, which will compensate for any distortion of the platen or shaft which would alter their parallelism or any unevenness of their surface of the platen; but when the shaft is rocked after the slight tension of the blades is released the blades will be raised from the platen on the shaft B and the paper may then be inserted. Since the tendency of the several blade-springs may cause the shaft to buckle upward, I provide guide-plates $B^8$, secured to any convenient part of the machine, as to the track-frame, having bent parts that engage the upper surface of the shaft, as shown in Fig. 10.

Having thus fully described my invention, what I claim as new, and desire to secure by Letters Patent of the United States, is—

1. The combination with a flat platen, of a work-holder blade arranged in a plane different from that of the platen, means for supporting the blade contiguous to but independent of the platen, a tension device connecting with the blade-support and operating and arranged to retain the blade in resilient engagement with the platen, means for raising the blades away from the platen, and means engaging the raising means to lock the same against the action of the tension device, substantially as described.

2. The combination with a flat platen, of a shaft, means for supporting the shaft independent of the platen, a work-holder blade mounted on the shaft and arranged in a plane different from that of the platen, a tension device connecting with the shaft and arranged to retain the blades in resilient engagement with the platen, means for raising the blades away from the platen, and means engaging the raising means to lock the same against the action of the tension device, substantially as described.

3. The combination with a flat platen, of a shaft, means for supporting the shaft independent of the platen, one or more blades mounted on the shaft and connected therewith and arranged in a plane different from that of the platen, a tension device arranged to rock the shaft and retain the blades in resilient engagement with the platen, means for raising the blades away from the platen, and means engaging the raising means to lock the same against the action of the tension device, substantially as described.

4. The combination with a flat platen, of a shaft, one or more blades having resilient connection with the shaft, and arranged in a plane different from that of the platen, and means for supporting the shaft with the blades, and having a resilient engagement with the platen, means for tilting the blades away from the platen, and means engaging the tilting means and locking them tilted, substantially as described.

5. The combination with a flat platen, of a shaft, means for supporting the shaft independent of the platen, one or more work-holder blades mounted on the shaft, a tension device arranged to rock the shaft, means for operating said blades, and means engaging said operating means and locking them against operation of the tension device the blades being so disposed and operated as to effect resilient connection between themselves and the platen, substantially as described.

6. The combination with a flat platen, of a shaft, journal-blocks for the shaft, one or more work-holder blades mounted upon the shaft, a coiled spring operating to hold each work-holder blade in contact with the platen, means for tilting the blades, and means for holding them against the action of the spring, substantially as described.

7. The combination with a flat platen, of a blade, means for supporting the blade contiguous to but independent of the platen, a tension device arranged normally to retain the blade in resilient engagement with the platen, means for raising the blade from engagement with the platen, and means engaging said raising means for retaining the blade in the raised position, substantially as described.

8. The combination with a flat platen, of a blade, means for supporting the blade contiguous to but independent of the platen, a tension device arranged normally to retain the blade in resilient engagement with the platen, means for raising the blade from engagement with the platen, and means for retaining the blade in a plurality of raised positions, substantially as described.

9. The combination with a flat platen, of a plurality of blades, means for supporting the blades contiguous to but independent of the platen, a tension device arranged normally to retain the blades in engagement with the platen, and means for raising the blades from engagement with the platen, and means engaging said raising means for locking them against action of the tension device, substantially as described.

10. The combination with a flat platen, of a blade, means for supporting the blade contiguous to but independent of the platen, a tension device arranged normally to retain the blade in engagement with the platen, means for raising the blade from engagement with the platen, and means for automatically and rigidly locking the blade in the raised position, and means for releasing the blade from its locked position, substantially as described.

11. The combination with a flat platen, of a blade, means for supporting the blade contiguous to but independent of the platen, a tension device arranged to normally retain the blade in engagement with the platen, means for raising the blade from engagement with the platen, means for rigidly locking the blade in the raised position, and independent means for tripping the blade from the locked position and permit it to be returned to engagement with the platen by the tension device, substantially as described.

12. The combination with a tiltable flat platen, of a blade, means contiguous to one edge of the platen but independent thereof disposed independent of the platen for supporting the blade contiguous to but independent of the platen, a tension device constructed to engage the supporting means and the blade and arranged to retain the blade normally in resilient engagement with the platen, and means, operable independent of the blade-supporting means, for tilting the blade out of its normal position, substantially as described.

13. The combination with a tiltable flat platen, of a blade, means independent of the platen for supporting the blade contiguous thereto, a tension device arranged normally to retain the blade in resilient engagement with the platen, means operable independent of the blade-supporting means for tilting the blade free from and out of the path of tiltable movement of the platen, and means for holding the blade in its tilted position, substantially as described.

14. The combination with a flat platen arranged to be tilted, of a blade, means for supporting the blade independent of the platen, a tension device arranged to retain the blade in engagement with the platen, and means for raising the blade from engagement with the platen and thereby permit the platen to be tilted, and means for locking the blade in the said raised position, substantially as described.

15. The combination with a flat platen, of a shaft, means for supporting the shaft at its extremities, a plurality of blades mounted on the shaft and connected therewith, a tension device arranged to cause the blades to have a resilient engagement with the platen, and arms arranged to support the shaft on the lower side intermediate said blades, substantially as described.

16. The combination with a flat platen, of a shaft, means for supporting the shaft at its extremities, one or more blades mounted on the shaft, a resilient connection between the blades and the shaft arranged to cause the blades to have a resilient engagement with the platen, and one or more arms arranged to support the shaft on the lower side at intermediate portions, substantially as described.

17. The combination with a flat platen, of a frame, one of said members being movable bodily relative to the other in a direction parallel with the surface of the platen, a shaft having one end held stationary relative to the platen, one or more blades connected with the shaft and held thereby in engagement with the platen, means on the said frame for supporting the other end of the shaft and permitting a relative axial movement of the shaft and supporting member of the frame, substantially as described.

18. The combination with a flat platen, of a frame, one of said members being movable bodily relative to the other in a direction parallel with the surface of the platen, a shaft having one end held stationary relative to the platen, one or more blades connected with the shaft and normally held thereby in engagement with the platen, means on the said frame for supporting the other end of the shaft and permitting a relative axial movement of the shaft and supporting portion of the frame, and means on the said supporting portion arranged to rotate the shaft in its several said latter relative positions, substantially as described.

19. The combination with a flat platen, of a frame, one of said members being movable bodily relative to the other in a direction parallel with the surface of the platen, a shaft having one end held stationary relative to the platen, one or more blades having a resilient connection with the shaft and normally held thereby in engagement with the platen, means on said frame for supporting the other end of the shaft and permitting a relative axial movement of the shaft and supporting portion of the frame, means on the said supporting portion of the frame arranged to rock the shaft and raise the blade from the platen, and means on the supporting portion for locking the shaft in the raised position, substantially as described.

20. The combination of a support member, a track-frame slidably mounted on the support member, a flat platen, a shaft having one end secured to said support member, and the other end slidably supported in said frame, one or more blades connected with the shaft and normally held thereby in engagement with the platen, and means on the frame for rocking the shaft and raising the blade from the platen, substantially as described.

21. The combination of a support member, a tiltable flat platen, a track-frame slidable on said support member and normally surrounding the platen, a shaft having one end secured to said support member and its other end slidably supported in said track-frame, one or more blades connected with the shaft and normally held thereby in engagement with the platen, and means on the said frame for rocking the shaft and raising the blade to permit the platen to be raised, substantially as described.

22. The combination with a flat platen, of a frame, one of said members being movable bodily relative to the other, a shaft having one end held stationary, relative to the platen, one or more blades connected with the shart and normally held thereby in engagement with the platen, a tubular bolt rotatably mounted on the said frame, said shaft having its other end slidably supported in the bore of said bolt and arranged to be rotated by the bolt in its several relative positions therein, and an operating-lever connecting with the bolt, substantially as described.

23. The combination with a flat platen, of a work-holder blade, means for supporting the blade, means for rotating the blade-support, means for locking the same in an adjusted position, and independent means for unlocking the same to cause the blade to contact with the platen, substantially as described.

24. The combination with a flat platen, a shaft, one or more work-holder blades carried by the shaft and normally held in engagement with the platen, a tubular member rotatably mounted and supporting one end of the shaft, a lever connecting with the shaft to operate the same, means for locking the shaft in one of a plurality of adjusted positions, and means for unlocking the same, and means for normally holding the blades in resilient engagement with the platen, substantially as described.

25. The combination with a flat platen, of a frame, one of said members being movable bodily relative to the other, a shaft having one end held stationary relative to the platen when the latter is in the normal position, one or more blades connected with the shaft, a tension device arranged to rock the shaft and normally retain the blades in resilient engagement with the platen, a tubular bolt rotatably mounted on the said frame, said shaft having its other end slidably supported in the bore of the bolt and arranged to be rotated by the bolt in its several relative positions therein, an operating-lever secured to the bolt and arranged to rock the same and thereby raise the blades from the platen, substantially as described.

26. The combination with a flat platen, a shaft, a tubular member in which one end of said shaft is inserted, the said shaft being constructed to permit a slidable movement thereon of the tubular member while the shaft remains stationary, a lever device connecting with the shaft to rotate the same for tilting the blades away from the platen, the lever being provided with locking-shoulders and a locking-pawl for engaging the locking-shoulders to hold the shaft when rotated, and means carried by the pawl for operating the same to disengage it from the locking-shoulders, and containing means serving to depress the blades when released from the locking means, substantially as described.

27. The combination with a flat platen, of a work-holder blade arranged in a plane different from that of the platen, means for supporting the blade, independent of the platen, a tension device connecting with the blade-support and operating and arranged to retain the blade in resilient engagement with the platen, means for raising the blade away from the platen, and means engaging said raising means to lock the same in a plurality of positions against action of the tension device, substantially as described.

28. The combination with a flat platen, of a shaft, means for supporting the shaft independent of the platen, a work-holder blade mounted on the shaft and arranged in a plane different from that of the platen, a tension device connecting with the shaft and arranged to retain the blade in resilient engagement with the platen, means for raising the blade away from the platen, and means engaging said raising means to lock the same in a plurality of positions against action of the tension device, substantially as described.

29. The combination with a flat platen, of a shaft, means for supporting the shaft independent of the platen, one or more blades mounted on the shaft and connected therewith and arranged in a plane different from that of the platen, a tension device arranged to rock the shaft and retain the blades in resilient engagement with the platen, means for raising the blade away from the platen, and means engaging said raising means to lock the same in a plurality of positions against action of a tension device, substantially as described.

30. The combination with a flat platen, of a shaft, means for supporting the shaft independent of the platen, one or more blades having resilient connection with the shaft and arranged in a plane different from that of the platen, means for supporting the shaft with the blades and having a resilient engagement with the platen, means for tilting the blades away from the platen, and means for engaging the tilting means and locking them tilted in one of a plurality of positions, substantially as described.

31. The combination with a flat platen, of a shaft, means for supporting the shaft independent of the platen, one or more work-holder blades mounted on the shaft, a tension device arranged to rock the shaft, means for tilting the blades away from the platen, and means for engaging the tilting means and locking them tilted in one of a plurality of positions, the blades being so disposed and operated as to effect resilient connection between themselves and the platen, substantially as described.

32. The combination with a flat platen, of a blade, means for supporting the blade contiguous to but independent of the platen, a tension device arranged normally to retain the blade in resilient engagement with the platen, means for raising the blade from engagement with the platen and means engaging said raising means for retaining the blade in one of plurality of raised positions, substantially as described.

33. The combination with a flat platen, of a plurality of blades, means for supporting the blades contiguous to but independent of the platen, a tension device arranged normally to retain the blades in engagement with the platen, means for raising the blades from engagement with the platen, and means engaging said raising means for locking it in a plurality of positions against action of the tension device, substantially as described.

34. The combination with a flat platen, of a blade, means for supporting the blade contiguous to but independent of the platen, a tension device arranged normally to retain the blade in engagement with the platen, means for positioning the blade in one of a plurality of retained, raised positions, and means for automatically and rigidly locking the blade in one of said raised positions, substantially as described.

35. The combination with a flat platen, of a blade, means for supporting the blade contiguous to but independent of the platen, a tension device arranged to normally retain the blade in engagement with the platen, means for raising the blade from engagement with the platen, means for rigidly locking the blade in one of a plurality of positions, and means for tripping the blade from the locked position and permit it to be returned to engagement with the platen by the tension device, substantially as described.

36. The combination with a flat platen, of a blade, means for supporting the blade contiguous to, but independent of the platen, a tension device arranged to retain the blade in engagement with the platen, means for raising the blade away from the platen, and means engaging said raising means to lock the same in a plurality of positions against action of the tension device, substantially as described.

37. The combination with a flat platen arranged to be tilted, of a blade, means for supporting the blade contiguous to, but independent of the platen, means for normally retaining the blade in engagement with the platen, means for raising the blade from engagement with the platen and thereby permit the platen to be tilted, and means for locking the blades in one of a plurality of positions, substantially as described.

38. The combination with a flat platen, of a work-holder blade, means for supporting the blade contiguous to but independent of the platen, means for rotating the blade-support, means for locking the same in one of a plurality of adjusted positions, and independent means for unlocking the same to cause the blade to contact with the platen, substantially as described.

39. The combination with a flat platen, of a tiltable work-holding blade coöperating therewith, means for supporting the blade independent of the platen, tensioning means for retaining the blade in engagement with the platen, and an automatic locking device for retaining the blade against the action of said tensioning means at a plurality of elevations above the platen.

40. The combination with a flat platen of a tiltable work-holding blade coöperating therewith, means for supporting the blade independent of the platen, a spring operating normally to retain the blade in engagement with the platen, operating means for tilting the blade away from the platen, and an automatic locking device arranged to engage with said operating means to retain the blade against the action of the spring at a plurality of elevations above the platen.

41. The combination with a flat platen, of a tiltable work-holding blade coöperating therewith and having depending guiding and gaging means, means for supporting the blade independent of the platen, a spring operating normally to retain the blade in engagement with the platen, and an automatic locking device operative upon slight elevation of the blade to retain the same against the action of the spring with said guiding and gaging means in operative position, said locking device being also operative to secure the blade at a greater elevation with said guiding and gaging means raised away from the work.

42. The combination with a tiltable flat platen, of a tiltable work-holding blade cooperating therewith and having depending guiding and gaging means, a spring operating normally to retain the blade in engagement with the platen, and an automatic locking device operative upon slight elevation of the blade to retain the same against the action of the spring with said guiding and gaging means in operative position, said locking device being also operative to secure the blade at a greater elevation to permit raising of the platen.

43. The combination with a tiltable flat platen, of a tiltable work-holding blade cooperating therewith, a spring operating normally to retain the blade in engagement with the platen, and an automatic locking device operative upon slight elevation of the blade to lock the same against the action of the spring to permit shifting of the work upon the platen, said locking device being also operative to secure the blade at a greater elevation to permit raising of the platen.

44. The combination with a flat platen, of a tiltable work-holding clamp supported adjacent to and coöperating with the platen, and means carried by and depending from the work-holder for guiding work disposed on the platen, said work-holder being pivoted parallel to said guiding means.

45. The combination with a flat platen, of a work-holding clamp coöperating with the platen, means depending from and carried by the work-holder for guiding work upon the platen, and a pivot member for said clamp disposed parallel to said guiding means.

46. The combination with a flat platen, of a tiltable work-holding clamp, means carried by and depending from the clamp for guiding work upon the platen, and a frame contiguous to the platen upon which said clamp is pivoted parallel to said guiding means.

47. The combination with a flat platen, of a tiltable work-holding clamp, a frame contiguous to the platen, a pivot member for said clamp mounted upon said frame, and paper-guiding means depending from the clamp and disposed parallel to said pivot.

48. The combination with a flat platen, of a combined work-holding clamp and work-guide disposed contiguous to and coöperating with one longitudinal edge of the platen, and a longitudinally-arranged pivot for said member to permit the tilting thereof away from the platen.

49. The combination with a flat platen, of a rod disposed parallel and adjacent to one longitudinal edge of the platen, and a combined work-holding clamp and guide pivotally supported by said rod and coöperating with the platen.

50. The combination with a flat platen, of a tiltable work-holding clamp coöperating with the platen, means depending from said clamp for guiding and gaging work longitudinally of the platen, and a track-frame upon which said clamp is pivoted parallel to said guiding means.

51. The combination with a flat platen, of a work-holding clamp coöperating with the platen, paper-guiding means depending from the clamp, a pivot for said clamp disposed parallel to said guiding means, and means for elevating said clamp to position said guiding means for operation.

52. The combination with a flat platen, of a movable work-holding clamp, a support therefor, means carried by the clamp for guiding the work when said clamp is elevated, means for elevating said clamp to position said guiding means for operation, and means for locking said clamp in its elevated position to maintain the guiding means in operative position, substantially as described.

53. The combination with a flat platen, of a movable work-holding clamp, a support therefor, means carried by the clamp for guiding the work when said clamp is elevated, means for elevating said clamp to position said guiding means for operation, means for locking said clamp in its elevated position to maintain the guiding means in operative position, and means for releasing the locking means, substantially as described.

54. The combination with a flat platen, of a movable work-holding clamp, a support therefor, means carried by the clamp for guiding the work when said clamp is elevated, means for elevating said clamp to position said guiding means for operation, means for locking said clamp in its elevated position to maintain the guiding means in operative position, means for releasing the locking means, and means for effecting return of the clamp to its normal clamping position, substantially as described.

55. The combination with a flat platen, of a work-holding clamp coöperating with the platen, paper-guiding means depending from the clamp, a pivot for said clamp arranged parallel to said guiding means, means for elevating said clamp to position said guiding means for operation, and means for effecting return of the clamp to normal clamping position.

56. The combination with a flat platen, of a movable work-holding clamp, a support therefor, means carried by the clamp for guiding the work when said clamp is elevated, means for elevating said clamp to position said guiding means for operation, and means for locking said clamp, when elevated, in one of a plurality of positions, substantially as described.

57. The combination with a flat platen and a movable frame, of a work-holding clamp coöperating with the platen, paper-guiding means depending from the clamp, and a pivot for said clamp carried by the frame parallel to said paper-guiding means.

58. The combination with a flat platen, of a support member, a movable track-frame slidably supported at its rear end on said support member, and a work-holding clamp coöperating with the platen to secure the work-sheet thereto and arranged to remain stationary against the platen when the track-frame is slidingly moved, substantially as described.

59. The combination with a flat platen, of a support member, a movable track-frame slidably supported at its rear end on said support member, a work-holding clamp coöperating with the platen to secure the work-sheet thereto and arranged to remain stationary against the platen when the track-frame is slidingly moved, and means carried by the work-holding clamp for guiding the work on the platen, substantially as described.

60. The combination with a flat platen, of a support member upon which the platen is supported at its rear end, a track-frame horizontally adjustable at its rear end upon said support member, a bracket carried by said support member, a work-holder clamp bearing normally upon the platen and having its rear end movably supported in said bracket and permitting said clamp to remain stationarily in contact with the clamp when the track-frame is horizontally adjusted, substantially as described.

61. The combination with a flat platen, of a support member, a movable track-frame horizontally adjustably supported on said support member, a work-holding clamp non-adjustable horizontally, but otherwise movable with said track-frame, substantially as described.

62. The combination with a flat platen and a track-frame, one slidable relative to the other, a clamping-guide having engagement with the platen and remaining stationarily in such engagement when the horizontal relation of the platen and track-frame is changed, substantially as described.

63. The combination with a flat platen and a movable track-frame, a support member slidably supporting said track member, a clamping work-holder having one end secured to said support member, and means carried by the track-frame for slidingly holding the opposite end of said clamp, substantially as described.

64. The combination with a flat platen and a movable track-frame, a support member slidingly supporting said track member, a clamping work-holder having one end secured to said support member, means carried by the track-frame for slidingly holding the opposite end of said clamp, and means for tilting said work-holder to one of a plurality of upraised positions, substantially as described.

65. The combination with a flat platen and a horizontally-slidable frame, of a work-holding clamp, normally in engagement with but supported independent of, and above the plane of, the platen and stationary against the sliding movement of the frame.

66. The combination with a flat platen and a horizontally-slidable frame, of a work-holding clamp connecting with the frame, normally in contact with the platen and stationary against horizontal movement of the same, but vertically movable away from the platen.

67. The combination with a flat platen and a horizontally-slidable frame, of a work-holding clamp, normally in engagement with the platen and stationary against the sliding movement of the frame, means for moving the clamp away from the platen, means for locking the same in a plurality of upraised positions, and independent means for unlocking the same.

68. The combination with a flat platen and a horizontally-slidable frame, of a work-holding clamp, normally in engagement with the platen and stationary against the sliding movement of the frame, means for moving the clamp away from the platen, means for locking the same in a plurality of upraised positions, independent means for unlocking the same, and guiding means carried by the work-holding clamp.

69. The combination with a flat platen and a horizontally-slidable frame, of a work-holding clamp, normally in engagement with the platen and stationary against the sliding movement of the frame, and guiding means carried by the clamp.

70. The combination with a flat platen, of a frame movable relative to the platen, a work-holder pivoted to said frame, and means for tilting said work-holder irrespective of the position of the frame, substantially as described.

71. The combination with a tiltable flat platen, of a frame inclosing and free from the platen and movable relative thereto, and a work-holder coöperating with the platen and pivoted on said frame so as to be movable out of the path of the platen independently of the movement or position thereof, substantially as described.

72. The combination with a tiltable flat platen, of a frame inclosing and free from the platen and movable relative thereto, a work-holder coöperating with the platen and pivoted on the frame, and means for tilting said work-holder out of the path of the platen independently of the movement of the frame, substantially as described.

73. The combination with a flat platen, a track-frame disposed contiguous to said platen, the platen and track-frame being horizontally adjustable one with relation to the other, and a work-holder constructed and arranged to bear upon the platen, the work-holder, the platen, and the work carried thereby, always being maintained in the same operable relation, substantially as described.

74. The combination with a tiltable flat platen, a track-frame disposed contiguous to said platen, the platen and track frame being horizontally adjustable one with relation to the other, and a work-holder constructed and arranged to bear upon the platen, the work-holder, the platen, and the work carried thereby, always being maintained in the same operable relation, substantially as described.

75. The combination with a tiltable flat platen, a movable track-frame disposed contiguous to said platen, the platen and track-frame being horizontally adjustable one with relation to the other, and a work-holder constructed and arranged to bear upon the platen, the work-holder, the platen, and the work carried thereby, always being maintained in the same operable relation, substantially as described.

76. The combination with a flat platen, a track-frame disposed contiguous thereto, and a work-holder arranged to bear upon the platen, the work-holder, the platen, and the work carried thereby, being always maintained in the same operable relation, substantially as described.

77. The combination with a flat platen, of a movable longitudinal track-frame, and a work-holding clamp coöperating with the platen and pivoted to said frame and tiltable independently of the movement of the frame, substantially as described.

78. The combination with a flat platen, of a movable frame, and a combined work-holder and guide coöperating with the platen and pivoted to the frame and tiltable independently of the movement and position of the frame, substantially as described.

79. The combination with a flat platen, of a movable frame, a work-clamp coöperating with the platen and pivoted to the frame, and tiltable independently of the movement and position of the frame, and work-guiding means depending from said clamp, substantially as described.

80. The combination with a tiltable flat platen, of a movable track-rail disposed at one side of and free from the platen, a work-holder coöperating with the platen and pivoted on said track-rail, and means for tilting said work-holder out of the path of the tiltable platen independently of the movement and position of the track-rail, substantially as described.

81. The combination with a tiltable flat platen, of a movable track-rail disposed at one side of and free from the platen, a combined work-holder and guide coöperating with the platen, and means for tilting said work-holder out of the path of the platen independently of the movement of the track-rail, substantially as described.

82. The combination with a flat platen, of a supporting element, a track-rail longitudinally slidable on said supporting element, and a work-holder mounted on said element and having movement in a direction different from that of the track-rail.

83. The combination with a flat platen, of a supporting element, a track-rail longitudinally adjustable on said supporting element, and a longitudinally-disposed work-holder coöperating with the platen and mounted at its rear end upon said supporting element and telescopically connected at its front end with the track-rail, substantially as described.

84. The combination with a flat platen, of a supporting element, a track-rail longitudinally adjustable on said supporting element, and a longitudinally-disposed work-holder coöperating with the platen and pivoted at its rear end upon said supporting element and telescopically and pivotally connected at its front end with the track-rail, substantially as described.

85. The combination with a flat platen, of a supporting element, a track-frame longitudinally adjustable on said element, and a longitudinally-disposed work-holder coöperating with the platen and mounted at its rear end upon said element and telescopically mounted at its front end in said track-frame, and stationary with the platen during the longitudinal adjustment of the track-frame, substantially as described.

86. In a typewriter, the combination of a tiltable flat platen, and a tiltable work-holder coöperating therewith and having a plurality of raised positions, the last of said positions permitting tilting of the platen past the work-holder.

87. In a typewriter, the combination of a tiltable flat platen, and a tiltable work-holder pivoted at one side of the platen and normally resting thereon, said work-holder having a plurality of raised positions and in the last of said positions clearing the platen to permit raising thereof.

88. In a typewriter, the combination of a flat platen pivoted at its rear, and a tiltable work-holder coöperating therewith and having a plurality of raised positions in which it is automatically retained, the last of said positions permitting tilting of the platen past the work-holder.

89. In a typewriter, a flat platen, a movable clamping-member disposed parallel to an edge of the platen, and a gage member carried by and movable with said clamping-member and normally occupying a position adjacent the edge of the platen, and movable, when the clamping-member is moved, relative to said platen-edge.

90. In a typewriter, a tiltable flat platen, a movable clamping-member disposed parallel to an edge of the platen, and a gage member carried by and movable with said clamping-member and adapted to occupy, normally, a position adjacent one edge of the platen and, when elevated, a slightly different position relative to said edge and, when the clamping-member is in its highest position, said gage member occupying a position, with the clamping-member, beyond the path of movement of the platen when tilted.

91. In a typewriter, a tiltable flat platen, a movable clamping-member disposed at an edge of said platen and adapted, normally, to rest upon the platen, an axial support for said clamping-member, and a guide or gage member carried by and movable with said clamping member and occupying, normally, a position between said axial support and the platen-engaging edge of the clamping-member, and adapted to be positioned, when the clamping-member is moved, relative to the adjacent edge of the platen, and, when the clamping-member is in its highest position, said guide or gage member occupying a position beyond the path of movement of the platen.

This specification signed and witnessed this 8 day of Oct. 15, 1908.

GEORGE W. DONNING.

Witnesses:
HARRY T. AMBROSE,
W. L. BILLMYER.